Figure 1:
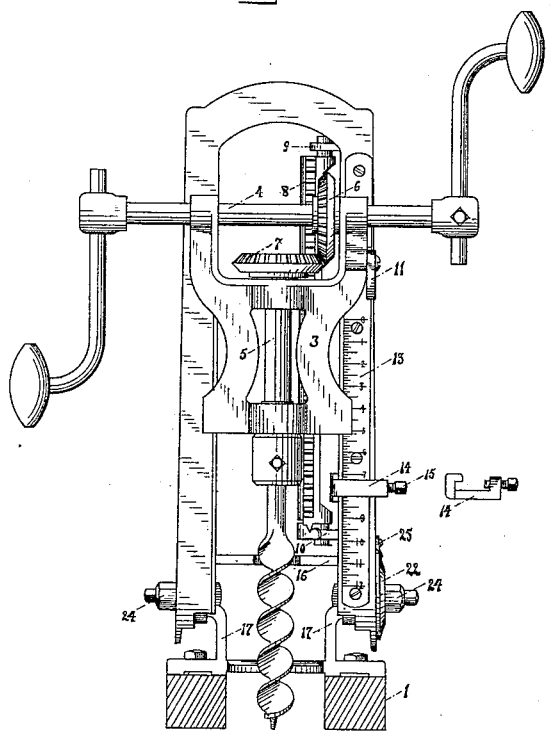

(No Model.)  2 Sheets—Sheet 1.

J. SWAN.
BORING MACHINE.

No. 354,073.  Patented Dec. 7, 1886.

Witnesses
Fred A. Strong.
C. E. Ruggles

Inventor
James Swan
By H. M. Wooster
Atty.

(No Model.) 2 Sheets—Sheet 2.
J. SWAN.
BORING MACHINE.
No. 354,073. Patented Dec. 7, 1886.
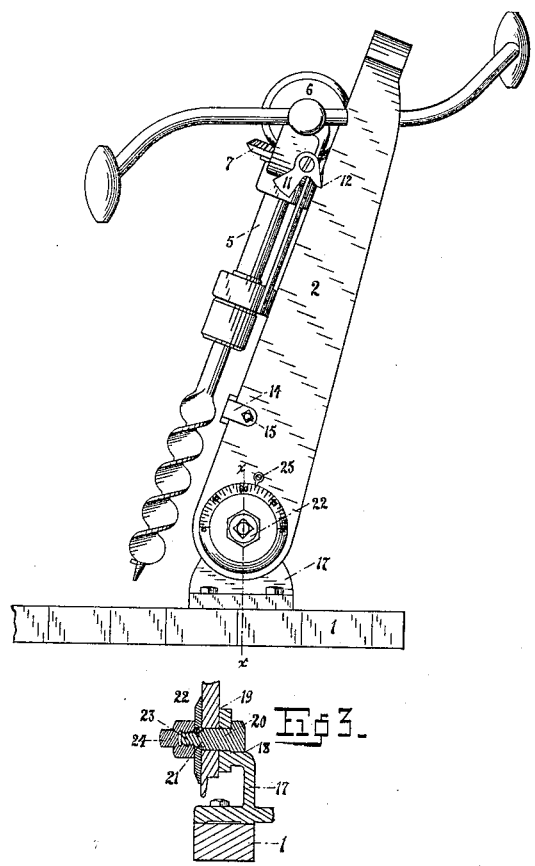
Witnesses
Fred A. Strong
C. E. Ruggles
Inventor
James Swan
By A. M. Wooster
Atty.

UNITED STATES PATENT OFFICE.

JAMES SWAN, OF SEYMOUR, CONNECTICUT.

BORING-MACHINE.

SPECIFICATION forming part of Letters Patent No. 354,073, dated December 7, 1886.

Application filed July 12, 1886. Serial No. 207,766. (No model.)

*To all whom it may concern:*

Be it known that I, JAMES SWAN, a citizen of the United States, residing at Seymour, in the county of New Haven and State of Connecticut, have invented certain new and useful Improvements in Boring-Machines; and I do hereby declare the following to be a full, clear, and exact description of the invention, such as will enable others skilled in the art to which it appertains to make and use the same.

My invention relates to the class of boring-machines illustrated in my former patents, No. 210,220, dated November 26, 1878, and No. 341,520, dated May 11, 1886, and has for its object to simplify and improve their construction and mode of operation, as will be hereinafter fully described, and then specifically pointed out in the claims.

In the accompanying drawings, forming part of this specification, Figure 1 is a front elevation of the entire machine, the base or bed being in section, the gage for adjusting the depth of the hole to be bored being also shown detached; Fig. 2, a side elevation, and Fig. 3 a section of one side of the machine on the line *x x* in Fig. 2.

Similar numbers denote the same parts in all the figures.

1 is the base or bed of the machine; 2, the pivoted frame-work by which the operative parts of the machine are carried; 3, the sliding carriage; 4, the shaft; 5, the spindle; and 6 and 7, beveled gears on the shaft and spindle, respectively, by which rotary motion is imparted to the spindle. 8 is a swinging rack, which is journaled in brackets 9 and 10, and 11 is a weighted catch or dog pivoted to the carriage and free to swing thereon. The function of this catch or dog is to engage a notch, 12, in the frame-work and hold the carriage at its raised position. As all these parts perform the same functions and in the same manner as in my former patent, No. 341,520, they are not thought to require any detailed description.

As it is often a matter of serious inconvenience in this class of machines that the depth of the holes cannot be determined and adjusted accurately and instantly, I have provided a scale, 13, on the face of the frame-work, graduated to inches and fractions thereof, and a sliding gage, 14, registering with said scale and adapted to act as a stop to limit the descent of the carriage in the act of boring, and, consequently, to limit the depth of the hole. This gage may be adjusted in any suitable manner; but I preferably use a set-screw, 15. In use it is simply necessary to set the gage at the portion of the scale corresponding in inches or fractions thereof with the depth of the hole that it is desired to bore. It is also in practice quite often necessary to bore holes at an inclination to the vertical line—that is, at an angle other than ninety degrees to the plane of the base—and, furthermore, to determine instantly and accurately the precise incline at which the hole shall be bored, no matter upon which side of the vertical line the angle of inclination may be.

In my present machine I have entirely changed the manner of securing the frame-work to the base. The two outer sides of the frame-work are preferably made parallel their entire length and rounded at the bottom, as shown in Figs. 1 and 2, the frame-work being strengthened by a cross-piece, 16, cast integral with or bolted thereto.

17 denotes brackets to which the sides of the frame-work are attached. These brackets are preferably cast in a single piece, which is also caused to span the base or bed in order to give strength and firmness to the machine. The brackets are provided with shoulders 18 and with faces 19, which lie parallel with the inner sides of the frame-work, so that the latter will turn freely thereon, as is clearly shown in Fig. 3.

20 denotes studs having enlarged heads, which rest upon shoulders 18, whereby rotation is prevented. The body of each stud passes through one of the brackets and through one side of the frame-work, as shown in Fig. 3, and is then provided with a reduced portion, 21, to one of which a dial, 22, is keyed.

23 is a threaded portion at the outer end of each stud, and 24 is a nut which engages the threaded portion, and which acts to clamp the side of the frame-work against the bracket, thus locking the latter in any desired position.

25 is a pointer upon the frame-work, which moves with the latter as it turns on the stud.

The dial may be graduated in any suitable manner. I preferably, however, graduate in both directions, from 0 at the sides to 90 at the top.

When it is desired to bore a hole at an angle in either direction, it is simply necessary to loosen nuts 24 and turn the frame-work in the proper direction until the pointer 25 indicates the desired degree of inclination. I preferably make nuts 24 double, as shown, so that they may ordinarily be turned by a small wrench; but a large one may be used to tighten them up, if necessary.

As the general operation of my present machine is identical with that shown and fully described in my former patent, No. 341,520, I have not thought best to describe it in this specification.

It will of course be understood that the details of construction may be considerably varied without departing from the spirit of my invention.

I claim—

1. The base, frame-work for carrying the boring mechanism, and brackets 17, cast in a single piece, which spans the frame-work, in combination with a stud passing through said brackets and the sides of the frame-work, said stud being held against rotation and the frame-work journaled thereon, and nuts 24, engaging the ends of the studs, whereby the frame-work may be locked in any desired position.

2. The base, brackets 17, and studs 20, held against rotation in said brackets, in combination with the frame-work journaled on said studs, a pointer carried by said frame-work, a stationary dial keyed to one of the studs, and nuts 24, engaging said studs, whereby the frame-work may be set and locked at any desired angle of inclination.

In testimony whereof I affix my signature in presence of two witnesses.

JAMES SWAN.

Witnesses:
 A. M. WOOSTER,
 C. E. RUGGLES.